United States Patent
Fahrny

(10) Patent No.: US 7,634,659 B2
(45) Date of Patent: Dec. 15, 2009

(54) ROAMING HARDWARE PAIRED ENCRYPTION KEY GENERATION

(75) Inventor: James W. Fahrny, Thornton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1786 days.

(21) Appl. No.: 10/247,861

(22) Filed: Sep. 20, 2002

(65) Prior Publication Data

US 2004/0057579 A1  Mar. 25, 2004

(51) Int. Cl.
*H04L 9/32* (2006.01)
(52) U.S. Cl. .................. 713/171; 713/168; 713/170; 705/67; 380/47
(58) Field of Classification Search .......... 713/162, 713/171, 168, 170; 380/262, 47; 705/67
See application file for complete search history.

(56) References Cited

U.S. PATENT DOCUMENTS

| | | | | |
|---|---|---|---|---|
| 6,463,533 B1 * | 10/2002 | Calamera et al. | ............ | 713/163 |
| 6,772,340 B1 * | 8/2004 | Peinado et al. | ............ | 713/168 |
| 6,879,690 B2 * | 4/2005 | Faccin et al. | ............ | 380/247 |
| 6,959,091 B1 * | 10/2005 | Sabin | ............ | 380/286 |
| 2002/0069359 A1 * | 6/2002 | Watanabe | ............ | 713/176 |

* cited by examiner

*Primary Examiner*—Michael J Simitoski
*Assistant Examiner*—Roderick Tolentino
(74) *Attorney, Agent, or Firm*—Patton Boggs LLP

(57) ABSTRACT

The roaming hardware paired encryption key generation coalesces a content variable with a network, or subnet, address to generate an encryption key. The source generates a content identification that is unique to the content being encryption and the network, or subnet, address is coalesced with the content indentification to generate a unique encryption key for the content being encrypted. The encrypted digital content is transmitted to the destination devices identified by the network, or subnet address, along with the content identification. At the destination, the destination devices regenerate the encryption by coalescing the content identification and the network, or subnet, address in the same manner as ciphertext is decrypted into plaintext.

13 Claims, 3 Drawing Sheets

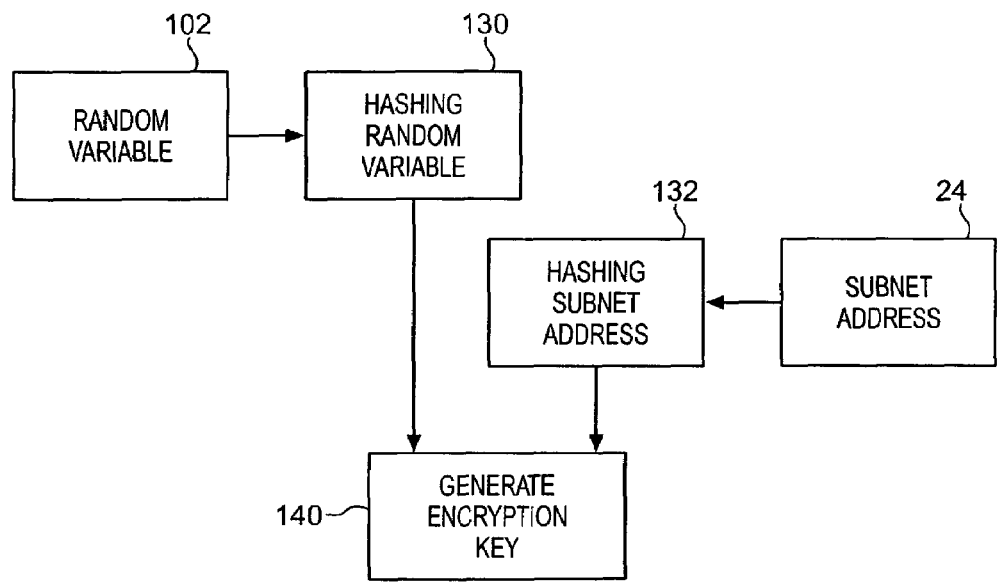
FIG. 4
FIG. 5
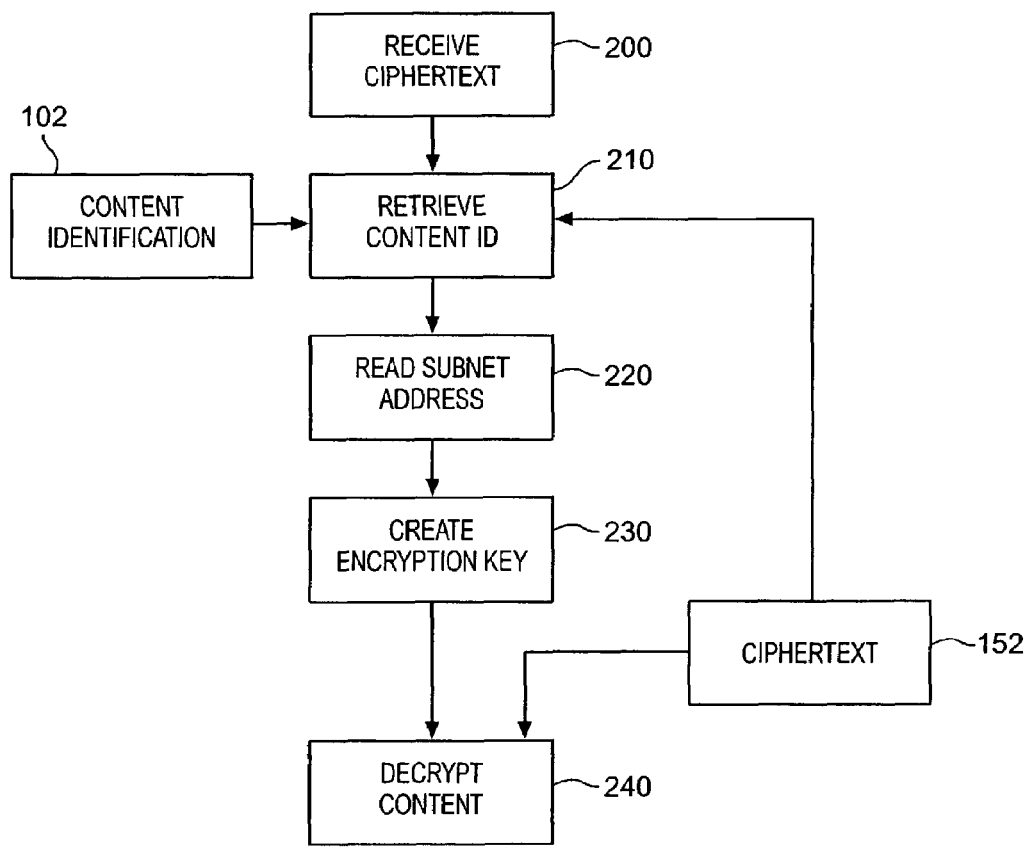

ROAMING HARDWARE PAIRED ENCRYPTION KEY GENERATION

FIELD OF THE INVENTION

The invention relates to encryption of plaintext, and in particular to a method for generating an encryption key with hardware binding for decrypting ciphertext on multiple interconnected devices.

Problem

It is a problem in the field of digital data to transmit digital content that can be accessed on more than one system when the digital content is encrypted utilizing an encryption key that is paired with the hardware on which the ciphertext is decrypted.

Reading and writing digital content across an unsecured interface to a storage device exposes the content to possible duplication and theft of information. Data that can be read and understood without any special measures is called plaintext. The method of disguising plaintext in such a way as to hide its message is called encryption. Encrypting plaintext results in unreadable gibberish called ciphertext. Encryption is used to ensure that information is hidden from anyone for whom it is not intended, including those who can see the encrypted data. The process of reverting ciphertext back to its original plaintext is called decryption.

Cryptography is the science of using mathematics to encrypt and decrypt data. Cryptography enables the storage of sensitive information or the transmission of the information across an insecure network so that it cannot be read by anyone except the intended recipient. A cryptographic algorithm, or cipher, is a mathematical function used in the encryption and decryption process. A cryptographic algorithm works in combination with a key—a word, number, or phrase—to encrypt the plaintext. The same plaintext encrypts to different ciphertext with different keys. Therefore, the security of the encrypted data is dependent on two things: the strength of the cryptographic algorithm and the secrecy of the key.

There are two types of encryption. Conventional encryption, also called secret-key or symmetric-key encryption, where one key is used for both encryption and decryption. Another encryption system, public key cryptography, is an asymmetric scheme that uses a pair of keys for encryption: a public key to encrypt the message and a corresponding private key to decrypt the encrypted message. For a sender and recipient to communicate securely using conventional encryption, they must agree upon a key and keep it secret between themselves. If they are at different physical locations, they must distribute the key via some secure communication medium to prevent the disclosure of the secret key during transmission.

A key having more than one segment where only one segment of the key is transmitted allows the key to be generated at the destination without the risks associated with transmitting the entire key over the insecure network to the destination. A known method for generating an encryption key of which only a segment of the key is transmitted to the destination is disclosed in U.S. patent application Ser. No. 10/035, 636. In the '636 application, the encryption key is "paired" with the host device to which the digital content is directed. The encryption key utilizes a content identification coalesced with a host identification and/or a random seed to generate the encryption key. Once generated by the origination device, only the content identification is transmitted to the host device. The host device includes the host identification that is stored in a secure location within the host device. Upon receipt of the ciphertext, the host device retrieves the host identification and the content identification and recreates the encryption key for decrypting the ciphertext. Alternatively, the host device may receive the encryption key from another source through a secure channel. Use of an encryption key that utilizes a content identification that is randomly generated at the source and a device identification to generate the encryption key enhances the security above conventional encryption.

However, pairing the digital content with the host device allows only one device to decrypt the ciphertext, the host device. A problem arises when the digital content being encrypted is transmitted to more that one device that is authorized to access the encrypted content. A solution to the problem has been to transmit multiple copies of the digital content, each encrypted with an encryption key generated using the particular host identification, to each host device. However, this solution is costly, time consuming, and requires the digital content provider to store multiple host identifications for a single customer and to generate multiple encryption keys to distribute the same digital content to multiple devices owned by the customer. Alternatively, a home video gateway such as the Moxibox could be used to decrypt the content at the gateway, and then re-encrypt the content for each device. This alternative method is also inefficient and costly.

For these reasons, a need exists for an encryption key that is generated using an identification that is associated with multiple devices owned by the customer on which the customer is authorized to access the encrypted content.

Solution

The roaming hardware paired encryption key system overcomes the problems outlined above and advances the art by providing a method of combining the speed of conventional encryption with the security of public key encryption. Multiple device interconnected via a network are authorized to access the encrypted digital content provided by the source. An encryption key is generated at the source from a content identification that identifies the content being encrypted and a network address (for all devices on that consumer's home network) of the multiple devices. To distinctly identify only a subset of the multiple of devices which are interconnected via the network, a subnet address is assigned to the subset of devices and the encryption key then utilizes the subnet address of the subset of devices and the content identification to generate the encryption key.

The encrypted digital content is transmitted to the multiple devices, or subset thereof, along with the content identification. Transmitting only a portion of the encryption key to the multiple devices enhances the security above convention encryption. At the destination, the multiple devices or subset thereof, the encryption is regenerated by coalescing the content identification and the network, or subnet, address in the same manner as coalesced at the source device. After regenerating the encryption key, the ciphertext is decrypted into plaintext.

BRIEF DESCRIPTION OF THE DRAWINGS

FIG. 4 illustrates a flow diagram of a sample method of generating the encryption key system; and FIG. 5 illustrates a flow diagram for decrypting ciphertext using the present roaming hardware paired encryption key generation system.

DETAILED DESCRIPTION

The present roaming hardware paired encryption key generation system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Music, movies, software and other digital data in digital format is transmitted from a source to a customer via a network. To prevent use of the digital data by unauthorized individuals, the digital data may be encrypted prior to transmission over an insecure network. Reading and writing digital content across an unsecured interface to a storage device exposes the content to possible duplication and theft of information. Data that can be read and understood without any special measures is called plaintext. The method of disguising plaintext in such a way as to hide its message is called encryption. Encrypting plaintext results in unreadable gibberish called ciphertext. Encryption is used to ensure that information is hidden from anyone for whom it is not intended, including those who can see the encrypted data. The process of reverting ciphertext back to its original plaintext is called decryption. Cryptography is the science of using mathematics to encrypt and decrypt data. Cryptography enables the storage of sensitive information or the transmission of the information across an insecure network so that it cannot be read by anyone except the intended recipient.

A cryptographic algorithm, or cipher, is a mathematical function used in the encryption and decryption process. A cryptographic algorithm works in combination with a key—a word, number, or phrase—to encrypt the plaintext. The same plaintext encrypts to different ciphertext with different keys. Therefore, the security of the encrypted data is dependent on two things: the strength of the cryptographic algorithm and the secrecy of the key.

There are two types of encryption. Conventional encryption or symmetric key encryption where one key is used for both encryption and decryption and public key cryptography, an asymmetric scheme that uses a pair of keys for encryption: a public key to encrypt the message and a corresponding private key to decrypt the encrypted message. The present roaming hardware paired encryption key generation provides a method for generating an encryption key for use with a conventional encryption system wherein a portion of the encryption key is transmitted to the destination along with the encrypted content where the key is regenerated for use in decrypting the ciphertext.

Figure 1:
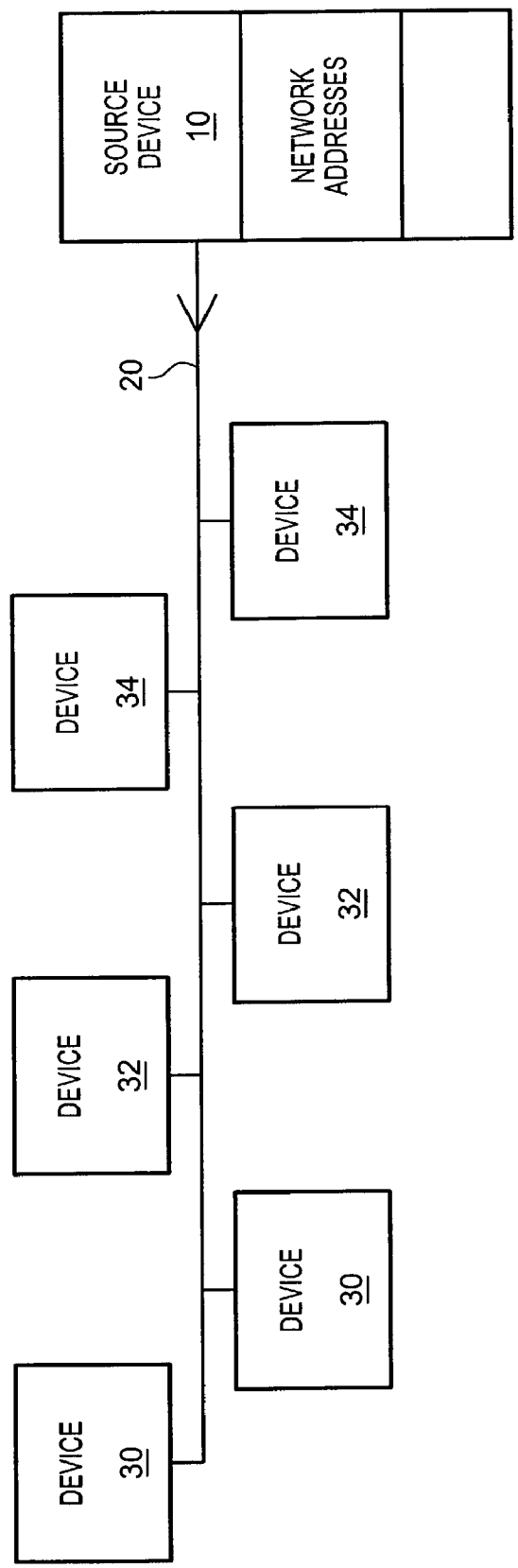
FIG. 1 illustrates a block schematic diagram of a system utilizing the present roaming hardware paired encryption key generation system.
Figure 2:
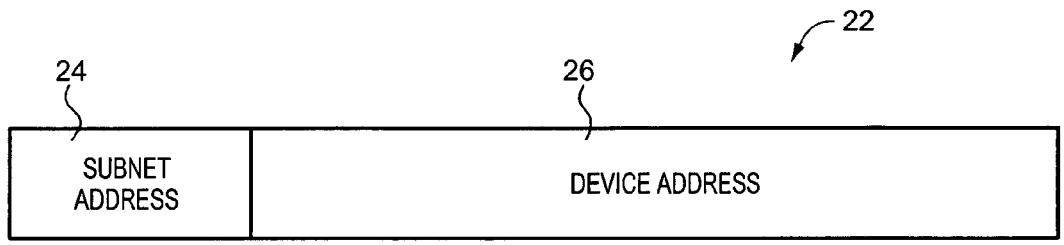
FIG. 2 illustrates an address field for identifying devices connected to the network illustrated in FIG. 1.

Network—FIGS. 1 and 2:

Referring to FIG. 1, a network 20 is a communication medium that serves multiple devices 30-35 which are connected to network 20. Digital data is transmitted to the devices 30-35 over the network 20 using the network address to identify the specific network. Ciphertext is transmitted to the device served by the network by attaching the network address to the generated ciphertext. When the ciphertext is intended for transmission and usage by more than one device connected to the network, each device is required to have a unique identifier. Multiple devices connected to a network have a network address of which the least significant bits (LSBs) may be used to identify an individual device. Alternatively, one or more of the devices 30-35 may be connected together as a subnet. A subnet is a portion of a network which shares the network address but is distinguished from the other portions of the network by a subnet number, or subnet address. In other words, a subnet is to a network what a network is to the Internet.

Referring to FIG. 2, a network address 22 may include a subnet address 24 using the most significant bits (MSBs) of the network address 22. When more than one device connected to the subnet, each device must be individually identifiable. As described above, the LSB of the network address 22 may include the device identification. The devices may be grouped in subsets based on the type of digital content that is utilized with each device and wherein each subset of devices is identified with a corresponding subnet address 24. When digital content is transmitted to the subset of devices on the subnet, the network address 22 includes the corresponding subnet address 24 and the device address 26.

Using the present roaming hardware paired encryption key generation system, an encryption key is generated wherein only a portion of the encryption key is transmitted to the destination with the ciphertext. The other portion of the encryption key is known by the source device which generated the encryption key and the destination devices to which the ciphertext is being transmitted. Thus, only the source device that encrypted the data and the devices to which the ciphertext is transmitted have the information necessary to recreate the encryption key to decrypt the resulting ciphertext. This method combines conventional and public key cryptography. One portion of the encryption key is analogous to the public key and transmitted with the ciphertext while the other portion of the key resides within the destination device is analogous to the private key. Like conventional cryptography, the same key that is used to encrypt the data at the source device is used to decrypt the ciphertext at the destination device. The source may be a home gateway device or a source of content that is located outside of the home. In the embodiment described, the public key is a content identification number and the private key is a subnet address for purpose of illustration and discussion although alternative public keys and device identification may be substituted.

The content variable is a unique identification that is generated by source device 10. Each block of plaintext to be transmitted is assigned a unique content identification. The unique content identification can be a randomly generated number, can be created sequentially, or another method of setting the content variable could be substituted. Other known methods for generating a content variables include randomly selecting an initial content variable number and incrementing the content variable for transmission of successive blocks or the initial content identification could be derived from a protocol such as Real-time Transport Protocol (RTP). Those skilled in the art will appreciate that alternative methods of generating a content variable may be substituted. For purpose of illustration, the present encryption key generation method is described and illustrated using a variable randomly generated by the source device.

Thus, the present roaming hardware paired encryption key generation system allows businesses that transmit secure data over an unsecured interface for receipt at another location to encrypt the data for transmission and transmit the ciphertext with a portion of the encryption key. The destination device receives the ciphertext and regenerates the encryption key to decrypt the ciphertext at the destination devices. The private portion of the key, the network address or the subnet address, is unique to the customer, therefore generating an encryption key that cannot be regenerated by a device having a different network or subnet address. The combination of the two encryption methods combines the convenience of public key encryption with the speed of conventional encryption. Used together, the present roaming hardware paired encryption key generation improves performance and encryption key distribution.

Figure 3:
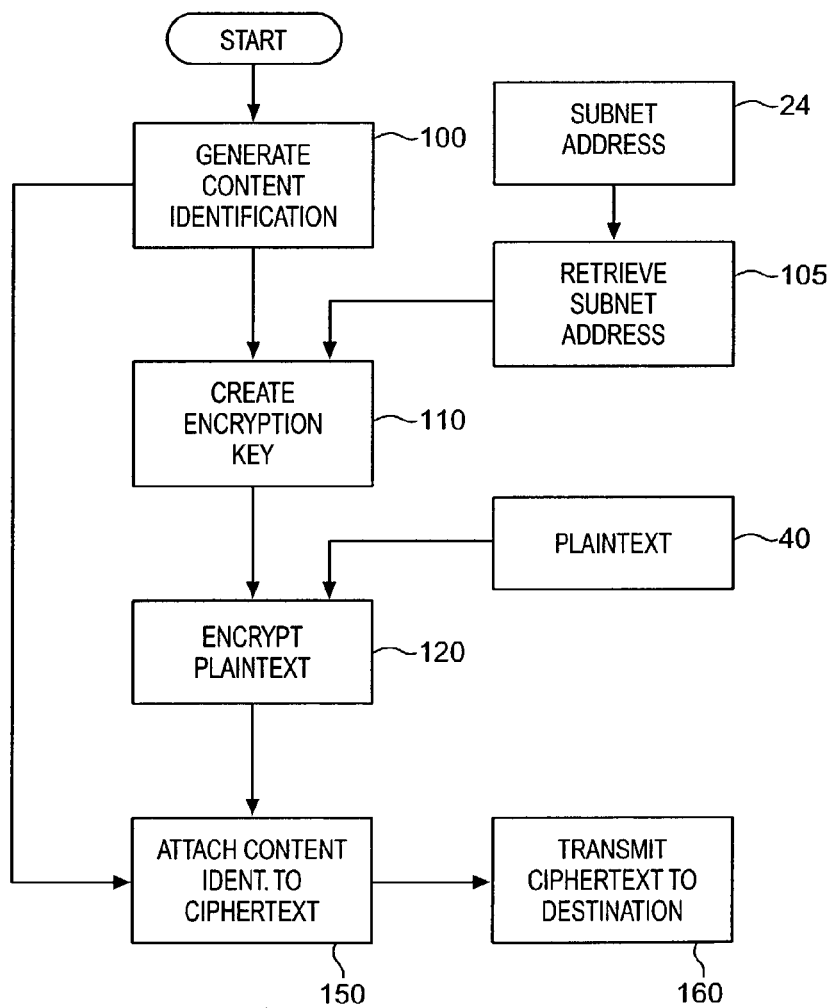
FIG. 3 illustrates a flow diagram for encrypting plaintext using the present roaming hardware paired encryption key generation system.

Encryption and Transmission—FIGS. 3 and 4:

In the case of multiple destination devices, a content identification is generated for each block of data, such as of plaintext, to be transmitted across an unsecured interface to the destination devices. The destination devices can all be connected to a network or can be a subset of devices connected to the network, in which case they constitute a subnet within the network. The transmission can be to an entire network or subnet. Using the network or subnet address and the content identification, the source device generates an encryption key having the following properties. First, encryption key is unique to the devices identified by the subnet address. Second, the encryption key is deterministic. Whichever method is followed by the source device to generate the encryption key from the subnet address and the content variable, the same method is used to generate all encryption keys. Using the same method to generate the encryption key results in an encryption key that is deterministic. In other words, using the same subnet address and the same content variable to generate the encryption key always generates the same encryption key. Therefore, using the same subnet address and content variable transmitted with the ciphertext generates the same encryption for use decrypting the ciphertext.

Generating an encryption key using a subnet address provides a method for preventing another device from receiving and decrypting the ciphertext. If another device recovered the content identification appended to the ciphertext, the encryption key generated by that device would combine the subnet address of the unauthorized device and the content variable to generate the encryption key. Since the subnet address is different, the encryption key generated would be different even if the same method of generating the encryption key were followed.

Referring to FIG. 3, in step 100 the source device generates a random content identification and retrieves the network/subnet address from a directory of network and subnet address in step 105. The encryption key is generated by the source device by coalescing the content variable and the subnet address in step 110. Using the encryption key generated in step 110, the source device encrypts the block of plaintext in step 120 using a standard block cipher encryption method such as data encryption standard (DES), triple DES, advanced encryption standard (AES) or other standard block cipher encryption method. The content identification is attached to the resulting ciphertext in step 150 and the ciphertext and attached content variable are transmitted in step 160 to the destination device over the unsecured network.

A variety of methods may be used to coalesce the subnet address and the content identification to generate the encryption key. One such method may be to hash the content identification 102 in step 130, hash the subnet address 24 in step 132 and in step 140, then generate the encryption key using the hashed values as illustrated in FIG. 4. Hashing may be performed using a one-way hashing function such as SHA-1 or MD5 or an alternative hashing function may be substituted. In step 140 a logical operation may be performed on the hashed results or an alternative method of further coalescing the hashed results may be substituted such as concatenating the hashed resultants. Therefore, changing the content variable for each block of plaintext provides a method for generating a unique encryption key for each block of plaintext. Alternatively, a Diffie-Hellman key exchange may be performed between the source and the destination. The shared key that is possessed by both sides may then be used as a seed for generating the symmetric key using the subnet address and the content identification.

Decryption of Ciphertext—FIG. 5:

Referring to FIG. 5, after receiving the ciphertext and attached content identification in step 200, the encryption key is regenerated. The destination device retrieves the content identification 102 from the ciphertext in step 210 and retrieves the subnet address in step 220. Whichever method of coalescing was followed to generate the encryption key in step 110 (FIG. 3) from a combination of the content identification and the subnet address, the same method is used to generate the encryption key in step 230 for decrypting the ciphertext 152 in step 240.

As previously discussed, using the same method generate the encryption key results in an encryption key that is deterministic. In other words, using the same content identification and subnet address to generate the encryption key will always produce in the same encryption key. Referring to FIGS. 3 and 5, the encryption keys generated in steps 110 and 230 are the same encryption keys. The encryption key generated in step 230 is used in step 240 to decrypt the ciphertext retrieved in block 200.

As to alternative embodiments, those skilled in the art will appreciate that the present roaming hardware paired encryption key generation may be implemented with alternative random variables. While although the content identification can be incremented for each successive block of plaintext, alternative methods of modifying or generating a new content identification for each successive block of plaintext can be substituted. Likewise, while the method of coalescing included hashing the content identification and the subnet address, alternative methods may be substituted or added such as performing a logical function of the variables or the hashed resultants.

It is apparent that there has been described a roaming hardware paired encryption key generation that fully satisfies the objects, aims, and advantages set forth above. While the roaming hardware paired encryption key generation has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed:

1. A method for generating an encryption key for use by a host device to encrypt data for access by multiple devices connected on a network, said method comprising:

generating a content identification for said data;

retrieving a network address that is unique to said multiple devices;

using both said content identification and said network address to produce said encryption key;

encrypting said data with said encryption key to produce a ciphertext; and attaching only said content identification portion of said encryption key to said ciphertext for transmission to said multiple devices identified by said network address over said network.

2. The method of claim 1 wherein said using comprises:
hashing said content identification to produce a first hashed variable;
hashing said network address to produce a second hashed variable; and
coalescing said first hashed variable and said second hashed variable to produce said encryption key.

3. The method of claim 1 wherein generating a content identification comprises:
generating a random variable by said host device.

4. The method of claim 3 further comprising:
attaching said random variable absent said network address to said ciphertext for transmission to said multiple devices identified by said network address over said network.

5. The encryption method of claim 4 for further use decrypting said ciphertext, the method comprising:
retrieving said random variable attached to said ciphertext;
coalescing said random variable and said network address to produce said encryption key; and
decrypting said ciphertext with said encryption key to produce said data.

6. The encryption method of claim 3 further comprising:
encrypting said data with said encryption key to produce a ciphertext; and
transmitting said ciphertext and said random variable to said multiple devices identified by said network address over said network.

7. The encryption method of claim 6 for further use decrypting said ciphertext, the method comprising:
retrieving said random variable;
coalescing said random variable and said network address to produce said encryption key; and
decrypting said ciphertext with said encryption key to produce said data.

8. A method for encrypting data for distribution to a selected plurality of devices that are connected to a network chat has a network address, wherein said network address includes an address common to said selected plurality of devices, the method comprising:
retrieving said network address;
generating a random variable for said data;
generating an encryption key from said network address and said random variable;
encrypting said data using said encryption key to produce a ciphertext; and
transmitting said ciphertext and only said random variable portion of said encryption key to said selected plurality of devices, identified by said network address, over said network.

9. The method of claim 8 wherein said selected plurality of devices are connected to said network as a subnet that is distinguished from said network by a subnet address.

10. The method of claim 9 further comprising:
attaching said random variable to said ciphertext for transmission to said selected plurality of devices.

11. The encryption method of claim 10 for further use decrypting said ciphertext, the method comprising:
retrieving said random variable attached to said ciphertext;
coalescing said random variable and said subnet address to produce said encryption key; and
decrypting said ciphertext with said encryption key to produce said data.

12. The encryption method of claim 9 further comprising:
transmitting said random variable to said selected plurality of devices identified by said subnet address over said network.

13. The encryption method of claim 12 for further use decrypting said block of ciphertext, the method comprising:
retrieving said random variable;
coalescing said random variable and said subnet address to produce said encryption key; and
decrypting said ciphertext with said encryption key to produce said data.

* * * * *

UNITED STATES PATENT AND TRADEMARK OFFICE
CERTIFICATE OF CORRECTION

PATENT NO. : 7,634,659 B2  Page 1 of 1
APPLICATION NO. : 10/247861
DATED : December 15, 2009
INVENTOR(S) : James W. Fahrny It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2052 days.

Signed and Sealed this

Ninth Day of November, 2010

David J. Kappos
*Director of the United States Patent and Trademark Office*